United States Patent [19]

Pilny et al.

[11] 4,366,194

[45] * Dec. 28, 1982

[54] RENDERING POROUS STRUCTURES IMPERMEABLE BY TREATMENT WITH PH INSENSITIVE GELABLE COMPOSITIONS OF AMIDE POLYMERS AND COMPOSITION

[75] Inventors: Richard J. Pilny; Thomas W. Regulski, both of Midland, Mich.

[73] Assignee: The Dow Chemical Co., Midland, Mich.

[*] Notice: The portion of the term of this patent subsequent to Apr. 22, 1997, has been disclaimed.

[21] Appl. No.: 141,866

[22] Filed: Apr. 21, 1980

Related U.S. Application Data

[63] Continuation of Ser. No. 911,863, Jun. 2, 1978, Pat. No. 4,199,625.

[51] Int. Cl.$^3$ .................................. B05D 3/02
[52] U.S. Cl. .................................. 427/385.5; 525/154; 138/97; 166/295; 405/264; 405/270; 427/136; 427/140; 427/393.6; 524/547; 524/555; 524/812; 524/827; 525/367; 525/385; 525/509
[58] Field of Search .................. 427/385.5, 393.6, 136, 427/140; 428/36, 524, 35; 166/285, 300, 244 C, 295; 252/8.55 R, 316; 138/89, 145, 97; 260/29.4 R, 29.4 UA; 525/327, 509, 336, 367, 388; 405/263, 264, 270; 52/743, 309.1, 309.3, 744; 524/547, 555, 812, 827

[56] References Cited

U.S. PATENT DOCUMENTS

| | | | |
|---|---|---|---|
| 2,856,380 | 10/1958 | Roth et al. | 260/42.12 |
| 2,940,729 | 6/1960 | Rakowitz | 166/295 |
| 3,244,640 | 4/1966 | Studt et al. | 252/316 |
| 3,437,625 | 4/1969 | Bonnel et al. | 260/29.4 R |
| 3,520,925 | 7/1970 | Koenig et al. | 71/119 |
| 3,556,221 | 1/1971 | Haws et al. | 166/305 |
| 3,759,197 | 9/1973 | Bracke | 405/264 |
| 3,759,857 | 9/1973 | Bracke | 260/29.6 H |
| 3,810,468 | 5/1974 | Harper et al. | 128/284 |
| 3,875,697 | 4/1975 | Bracke | 405/264 |
| 3,953,342 | 4/1976 | Martin et al. | 166/275 |
| 4,064,940 | 12/1977 | Sparlin | 405/263 |
| 4,155,405 | 5/1979 | Vio | 405/264 |
| 4,199,625 | 4/1980 | Pilny et al. | 427/385.5 |
| 4,291,069 | 9/1981 | Pilny | 427/136 |

*Primary Examiner*—Sadie L. Childs

[57] ABSTRACT

Aqueous solutions of amide polymers, such as polyacrylamide when treated with small amounts of a water-soluble polyaldehyde and a hypohalite salt at an alkaline pH, react to form firm gels within a short time at ambient temperature. Such gels, which are stable under alkaline as well as acidic conditions, are usefully employed to plug porous subterranean formations, for grouting of leaking soil pipes or wells, and to otherwise render porous structures impermeable to the passage of liquids such as water.

17 Claims, No Drawings

RENDERING POROUS STRUCTURES IMPERMEABLE BY TREATMENT WITH PH INSENSITIVE GELABLE COMPOSITIONS OF AMIDE POLYMERS AND COMPOSITION

CROSS-REFERENCE TO RELATED APPLICATION

This application is a continuation of Serial No. 911,863, now U.S. Pat. No. 4,199,625 issued Apr. 22, 1980.

BACKGROUND OF THE INVENTION

This invention relates to the rendering of porous structures impermeable to passage of liquid such as water by treating such porous structures with an aqueous gelable composition containing an amide polymer.

Soil stabilization and grouting have previously been accomplished by forming an aqueous gel in the unstable soil as shown, for example, in U.S. Pat. Nos. 2,856,380 and 2,940,729 wherein a solution containing an ethylenically unsaturated monomer together with a crosslinking monomer such as methylene bis-(acrylamide) is pumped into the ground and there polymerized in situ to form a crosslinked gel. Unfortunately, this prior art procedure not only exposes the operator to toxic monomers such as acrylamide but has been found on occasion to allow such toxic monomers to escape polymerization and thereby permeate into the soil water in toxic form. As a result, otherwise potable water sources are endangered.

Preformed, lightly crosslinked polymers and copolymers of acrylamide have been suggested as sorbents or gelling agents for aqueous fluids, for example, in U.S. Pat. Nos. 3,520,925 and 3,810,468. However, the preparation of such polymers or copolymers is very expensive. More importantly, insofar as the use of such pre-crosslinked polymers in soil treating applications are concerned, such polymers are not readily adapted to be pumped into porous soil, cracks in sewers or similar porous structures.

In view of the deficiencies of prior art methods for treating porous structures with polymeric materials to render them impermeable to passage of liquids such as water, it would be highly desirable to provide an improved method for so treating porous structures whereby the polymer to be employed is readily pumped into or otherwise incorporated in the porous structure to be rendered impermeable without polluting the porous structure and its surrounding environment with toxic substances.

SUMMARY OF THE INVENTION

Accordingly, the present invention is a method for rendering porous stuctures impermeable to the passage of liquids by treating them with an aqueous gelable reaction mixture comprising a water-soluble or water-dispersible aliphatic polyaldehyde, a hypohalite salt and a water-soluble polymer derived from an ethylenically unsaturated amide wherein the polymer, the hypohalite salt and the polyaldehyde are present in proportions and under conditions of temperature and alkaline pH sufficient to form a gel capable of rendering the porous structure impermeable.

In another aspect, this invention is an aqueous gelable reaction mixture comprising the aforementioned water-soluble amide polymer, polyaldehyde and hypohalite salt in proportion sufficient to cause the mixture to form an alkali-stable water-insoluble gel when the mixture is subjected to gelation conditions.

An embodiment of particular interest involves placing the aforementioned gelable composition in a porous subterranean formation and subsequently gelling the composition to render the formation impermeable. In a similar embodiment of interest, the gelable composition is pumped or otherwise forced into cracks or similar porosities in sewer pipes, potable water wells and like conduits and then gelled in place thereby plugging and thereby alleviating leakage from or into the conduits. This latter embodiment is hereinafter referred to as "grouting of porous structures."

It is among the advantages of the invention that water-insoluble gels, preferably those that are also firm, non-weeping, structurally sturdy and liquid impervious, are obtained from the gelable compositions employed in the practice of the present invention. It is a further advantage of the invention that the gelation reaction is initiated within a controlled reasonable period of time after the amide polymer, the hypohalite salt and the aliphatic polyaldehyde, preferably dialdehyde, are contacted in an aqueous medium having the proper controlled alkaline pH. Such gelation reaction proceeds readily at ambient or higher temperatures.

It is indeed surprising that the method of the present invention provides a firm gel capable of rendering a porous substrate impermeable. It is even more surprising that such gel, which forms very rapidly at alkaline pH, is very stable in both alkaline and acidic environments.

In addition to the aforementioned utilities of the present invention, the compositions employed in the present invention may also be employed in such applications as blocking off seepage under buildings or highways, preventing seepage loss through dams, dikes and irrigation ditches, blocking infiltration of polluted ground water into potable water wells or to replace aqueous gels prepared from gelatine or vegetable gums as, for example, in air-freshener devices or in gelled cosmetics such as roll-on deodorants and the like.

DETAILED DESCRIPTION OF THE EMBODIMENTS

The amide polymers employed in the practice of this invention have polyethylenic backbones bearing pendant carboxamide moieties. Such amide polymers are normally addition polymers containing polymerized ethylenically unsaturated carboxamide monomers which may contain up to 50 mole percent of another ethylenically unsaturated monomer copolymerizable with the carboxamide monomer or monomers. So long as the amide polymer has sufficient molecular weight to react with the polyaldehyde and hypohalite salt to form a desired firm gel, molecular weight of the amide polymer is not particularly critical. The viscosity of an aqueous solution of the amide polymer is an index of the molecular weight of said polymer and, thus, for most of the purposes of the present invention it is desirable to employ polymers of relatively low molecular weight so that a substantial proportion of solids can be incorporated in the aqueous solution of polymer without producing excessive viscosity such as to render the solution diffficult or impossible to pump. Gelation in accordance with the invention can be obtained with amide polymers having such low molecular weights as to be characterized by a viscosity of only about 50 centipoises for an aqueous 40 percent by weight solution of the polymer.

On the other hand, gelation can be obtained with amide polymers of very high molecular weight characterized, for example, by a viscosity of 60 centipoises for an aqueous 0.2 percent by weight solution thereof. In practice, to provide the firmness, abrasion resistance and structural stability desired in gels employed for plugging porous structures, as, for example, in and around sewer pipes, it is preferred to produce a gel containing from about 5 to 10 percent or more of amide polymer solids. Thus, for ease of handling and placing in the porous structure, it is preferred to employ amide polymers characterized by viscosities of from about 100 centipoises to about 15,000 centipoises for an aqueous 20 percent by weight solution thereof.

To form the desired gel capable of rendering the porous structure impermeable, the amide polymer preferably contains from about 50 to 100 mole percent of one or more ethylenically unsaturated carboxamide monomers, more preferably from about 70 to about 100 mole percent, and most preferably from about 90 to about 100 mole percent of amide monomers. Exemplary carboxamide monomers include acrylamide, methacrylamide, fumaramide, ethacrylamide, N-methylacrylamide and the like. It is understood that the finished polymer contains sufficient water-solvating carboxamide moieties to render the finished polymer soluble in water to the extent of at least 5 percent by weight and preferably to the extent of 20 percent or more by weight. Acrylamide, per se, is the preferred carboxamide monomer.

Examples of other monomers which may be copolymerized with the aforementioned amide monomers and which do not generally interfere with the gelation reaction include unsaturated aliphatic acids such as acrylic and methacrylic acid, and their water-soluble salts, particularly alkali metal salts, such as sodium acrylate or sodium methacrylate; hydroxy alkyl and alkyl esters of $\alpha,\beta$-ethylenically unsaturated carboxylic acids such as ethyl acrylate, methyl acrylate, butyl acrylate, methyl methacrylate, hydroxyethyl acrylate; sulfoalkyl esters of $\alpha,\beta$-ethylenically unsaturated carboxylic acids such as sulfoethyl acrylate and the sodium salt thereof, vinylbenzyl chloride and vinyl benzyl quaternary ammonium halides such as vinyl benzyl trimethyl ammonium chloride; isopropenyl oxazoline; monovinylidene aromatics and sulfonated monovinylidene aromatics such as styrene and sodium styrenesulfonate. Of course, it is understood that said other monomers should also be chosen so that they do not react with the amide monomer or otherwise interfere with the gelation reaction. Amide polymers are sometimes subject to some degree of hydrolysis during preparation or may purposely have a proportion of their amide groups hydrolyzed to carboxylate groups during or after preparation. For the purposes of this invention such partially hydrolyzed amide polymers are equivalent to the corresponding copolymers of carboxamide monomer and unsaturated aliphatic acid salt.

Also included within suitable amide polymers are graft polymers wherein the amide monomers or other suitable monomers are grafted on cellulosic polymers such as cellulose, methylated cellulose and hydroxypropyl methylcellulose.

In general, any aliphatic polyaldehyde, having sufficient solubility or dispersibility in water to enable rapid, intimate mixing with an aqueous solution of amide polymer, may be employed in the method of the present invention. In practice, saturated aliphatic polyaldehydes are preferred. Suitable polyaldehydes include dialdehydes, such as glyoxal, succinaldehyde, glutaraldehyde and the like, as well as more complex chemicals such as water-soluble or water-dispersible polyaldehyde starch derivatives. For most purposes a dialdehyde, particularly glyoxal, is preferred.

The hypohalite salt is suitably any metal hypohalite, but is preferably an alkali metal hypochlorite or hypobromite, most preferably sodium or potassium hypochlorite.

In practicing the method of this invention, it is only necessary that the amide polymer, hypohalite salt and the polyaldehyde be thoroughly mixed in the proper proportions in an aqueous medium under conditions of suitable alkalinity to provide a gelable aqueous reaction mixture. One such procedure is carried out by thoroughly mixing an aqueous solution of the hypohalite salt with an aqueous solution of the amide polymer and the polyaldehyde under proper alkaline conditions. Alternatively, an aqueous solution of polyaldehyde is mixed with an aqueous solution of amide polymer and hypohalite salt under proper alkaline conditions.

In the gelable aqueous reaction mixture, the concentration of the amide polymer varies depending upon the molecular weight of the polymer and the firmness of the gel desired. If the amide polymer has a relatively low molecular weight, the concentration of amide polymer is advantageously from about 0.25 to about 30, preferably from about 3 to about 20, most preferably from about 5 to about 15, weight percent based on the reaction mixture. For the purposes of this invention, an amide polymer has a relatively low molecular weight if a 40 weight percent aqueous solution of the polymer exhibits a viscosity in the range from about 50 to about 15,000 centipoises as determined by a Brookfield LVT viscometer (#2 spindle, 15 rpm, 25° C.). It is understood, however, that somewhat lower concentrations than the aforementioned can be employed with higher molecular weight amide polymers.

The concentration of polyaldehyde in the gelable reaction mixture is at least an amount sufficient to cause the reaction mixture to form a water-insoluble, three dimensional gel within 5 minutes after the mixture is subjected to gelation conditions, up to the saturation concentration of the polyaldehyde in the reaction mixture. Advantageously, however, the gelable reaction mixture contains enough polyaldehyde to provide from about 1 to about 300, preferably from about 5 to about 100, millimoles of aldehyde moiety per mole of carboxamide moiety

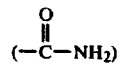

in the amide polymer. When the polyaldehyde is glyoxal, the concentrations of glyoxal sufficient to provide the aforementioned mole ratios are within the range from about 0.004 to about 1.2, preferably from about 0.02 to about 0.4, weight percent based on the gelable reaction mixture. For sewer grouting and similar subterranean plugging applications, it is preferred to employ from about 15 to 60 millimoles of polyaldehyde per mole of carboxamide moiety in the amide polymer.

The concentration of the hypohalite salt in the gelable reaction mixture is an amount sufficient to provide the resulting gel with alkaline stability. A gel possesses the requisite alkaline stability if it does not dissolve in an aqueous medium having a pH of 8 in a period of at least a week after the gel is placed in the aqueous medium. Gels having preferred alkaline stability do not dissolve in an aqueous medium having a pH of 8–10 for a period of six months, those gels which are insoluble in 5 N NaOH for a week being most preferred. The concentration of hypohalite salt is in the range from about 2 to about 600, preferably from about 10 to about 250, most preferably from about 15 to about 160 millimoles of the hypohalite anion per mole of carboxamide moiety in the amide polymer. The hypohalite salt is advantageously employed in the form of an aqueous solution prepared by dissolving the corresponding free halogen in a slight molar excess of alkali metal hydroxide or other relatively strong base with cooling to prevent the formation of halites or halates. As a result of this preferred practice, a solution is made which contains a mole of halide ion for each mole of hypohalite ion formed. A slight excess of the base is beneficially employed to stabilize the hypohalite solution and to provide an aqueous solution of hypohalite having a pH of at least about 12 and preferably a pH over 13 without containing such an excess of alkali as to cause undesired hydrolysis of the amide groups of the polymer when the hypohalite solution is mixed with the amide polymer solution. For economical reasons, it is desirable to employ a commercial household bleach which is an aqueous solution containing about 5.25 to 5.5 weight percent of sodium hypochlorite, an approximately equimolar proportion of sodium chloride and sufficient excess of sodium hydroxide to provide a solution having a pH of 13.5 or slightly higher. In commercial bleach the stabilizing excess of NaOH corresponds to about 0.3 to 1 percent by weight of the solution.

Advantageously, the pH of the reaction mixture at the initiation of gelation should be at least 7.5 up to 14, preferably from about 8 to about 13.5, most preferably from about 10 to about 13. This desired alkalinity at the outset of gelation is accomplished by the addition of a relatively strong base to one of the aforementioned starting ingredients, preferably the polyaldehyde and/or the hypohalite salt, most preferably the hypohalite salt, or to the reaction mixture prior to gelation. Generally any base capable of generating the needed alkaline pH which does not interfere with the gelation reaction is usefully employed. Examples of relatively strong bases advantageously employed to provide this desired alkalinity include alkali metal hydroxides such as sodium and potassium hydroxide; metal phosphates such as trisodium phosphate; metal carbonates such as sodium carbonate; alkylamines such as dimethylamine, methylamine and trimethylamine; and other organic bases such as ethylenediamine. Of the foregoing bases, those such as trisodium phosphate which provide a maximum pH in the range from about 9 to about 14 are preferred.

In practice, when operating temperatures from about 20° C. up to a temperature at which the amide polymer or other reactants degrade prematurely, the gelation reaction is initiated rapidly when an aqueous solution of the amide polymer and polyaldehyde is brought together with the hypohalite salt dissolved in the alkaline solution, particularly when the reaction mixture has a pH in the preferred pH range from about 10 to about 13. Thus, for example, when an aqueous polyacrylamide/glyoxal solution at a pH below 7 and at a temperature from about 20° C. to 25° C. is combined with an aqueous solution of sodium hypochlorite containing sufficient trisodium phosphate so that the pH of the resulting reaction mixture is in the range from about 10 to about 13.5, the resulting mixture sets to a firm water-insoluble gel within a matter of seconds while the pH falls to a value within the range of 7 to 11. It will be apparent to the skilled artisan that a wide range of gel times can be obtained with any particular mixture of amide polymer, hypohalite salt and polyaldehyde by suitable adjustment of the temperature or pH or both. Although less preferred than the gels made by the foregoing technique, suitable gels can be formed by first reacting the polyaldehyde with amide polymer and then contacting this gel reaction product with the hypohalite salt.

The amide polymer solutions employed may be prepared by known methods. Thus, for example, an amide monomer or monomer mixture as defined above may be dissolved in water and subjected to catalytic solution polymerization by addition thereto of a redox catalyst system such as a peroxide-bisulfite system or by the use of a peroxide or azo catalyst with controlled heating. Alternatively, the polymer may be prepared by known methods, e.g., U.S. Pat. No. 3,284,393, as a water-in-oil suspension or emulsion in a water-insoluble liquid such as a liquid hydrocarbon and the desired polymer solution be prepared by inverting said emulsion or solution in water, for example, with the aid of a surfactant. It is further understood that the amide polymer may be dried and then redissolved in an aqueous medium to form a suitable aqueous solution.

In the practice of the invention, it is generally necessary to provide means for placing the gelable reaction mixture in the position desired before gelation occurs. Thus, for example, an aqueous solution of the amide polymer and polyaldehyde and an alkaline solution of the hypohalite salt may be pumped by separate pipe systems and mixed at (or immediately adjacent to) the site where it is desired to deposit the gel. In the plugging of porous subterranean strata, as when undesired seepage is polluting a water well, packers can be placed above and below the porous strata. The amide polymer/polyaldehyde solution and alkaline hypohalite solution can then be introduced into the space between the packers through separate pipes whereby the solutions are mixed in said space and forced under pressure into the porous formation where gelation provides the desired plugging.

When a crack or perforated area is detected in a sewer pipe or well casing, for example, by remote television survey or other pipe or well logging method, it is convenient to employ a packer having endpieces which can be inflated hydraulically to provide positive pressure seals on either side of the cracked or perforated area, said endpieces being connected by a cylindrical member of somewhat smaller diameter than the diameter of the pipe or casing to define an annular space contiguous to the cracked or perforated area. Aqueous solutions of amide polymer polyaldehyde and hypohalite salt are preferably introduced rapidly under pressure through separate pipes in the proper proportions and at the proper alkalinity into the annular space where mixing occurs and the mixture is forced by pressure through the cracked or perforated area and into any porosities in the surrounding medium. When a sharp rise in back pressure is detected which indicates that gelation is occurring in the available porosities, pumping is discontinued and the packer is deflated and removed. Alternatively, one of the solutions employed above may be a solution of an amide polymer and polyaldehyde adjusted to an acidic pH in the range of 4 to 5 while the second solution consists of the hypohalite salt dissolved in an aqueous alkaline reagent such as a solution of sodium hydroxide or trisodium phosphate.

The following examples illustrate the invention but are not to be construed as limiting its scope. All parts and percentages are by weight unless otherwise indicated.

of ~11 and forms a firm, non-pourable, water-insoluble gel in the time specified in Table I. The gel does not dissolve or otherwise deteriorate significantly when it is immersed in 5 N NaOH for 17 days. The foregoing procedure is repeated several times using various amounts of glyoxal and sodium hypohalite as specified in Table I. In each instance, a firm, non-pourable gel is formed which exhibits considerable alkaline stability.

TABLE I

| Sample No. | Amount of Glyoxal[1] | | Amount of Sodium Hypochlorite[2] | | Gel Time, sec. | Alkaline Stability[3] |
|---|---|---|---|---|---|---|
| | ml of 40% solution | mmoles of glyoxal/mole of amide | g of 5.25% active solution | mmoles of hypochlorite/mole of amide | | |
| 1 | 0.16 | 9.9 | 6.4 | 40.5 | 20–22 | G |
| 2 | " | " | 9.6 | 60.7 | 22–25 | VG |
| 3 | " | " | 12.8 | 81.0 | 20–25 | E |
| 4 | 0.24 | 14.9 | 6.4 | 40.5 | 17–19 | G |
| 5 | " | " | 9.6 | 60.7 | 15–18 | VG |
| 6 | " | " | 12.8 | 81.0 | 18–20 | E |
| 7 | 0.32 | 19.8 | 6.4 | 40.5 | 18.–20 | G |
| 8 | " | " | 9.6 | 60.7 | 15–19 | VG |
| 9 | " | " | 12.8 | 81.0 | 18–20 | E |

[1]Amount of glyoxal is given in milliliters of 40% aqueous solution of glyoxal as well as millimoles of glyoxal per mole of amide moiety of the polyacrylamide.
[2]Amount of sodium hypochlorite is given in grams of 5.25% active aqueous solution of sodium hypochlorite as well as millimoles of hypochlorite per mole of amide moiety of the polyacrylamide.
[3]In defining alkaline stability, one volume of the gel is placed in 1.5 volumes of 5N NaOH for 17 days and then observed and rated as follows: G-gel absorbs up to ~90% of NaOH but remains as a firm, insoluble gel; VG-gel absorbs up to ~75% NaOH but remains as a firm, insoluble gel; E-gel absorbs less than ~50% NaOH and remains as a firm, insoluble gel.

EXAMPLE 1

An aqueous solution containing ~20 percent of a homopolymer of acrylamide is prepared and found to have a pH of about 5 and a viscosity of ~475 centipoises at 27° C. as determined with a Brookfield LVT viscometer using a #2 spindle at 30 rpm. To 25 grams of the foregoing solution is added with stirring 0.2 ml of a 40% solution of glyoxal in water. To this solution at 21° C. is added with mixing a second solution consisting of 17 g of deionized water, 0.425 g of $Na_3PO_4.12H_2O$ and 8 g of 5.25% aqueous solution of NaOCl. The resulting mixture has an initial pH of about 11.5 and forms a firm, non-pourable, water-insoluble gel in ~19 seconds. The gel is self-supporting and does not exude water on standing. The gel is immersed in 5 N NaOH for several days without any noticeable deterioration.

When the gelable composition of this example is placed in a porous subterranean structure and gelled by the foregoing procedure, the structure is rendered impermeable to the passage of aqueous liquid.

For purposes of comparison, a gel is prepared according to the foregoing procedure except that no NaOCl is employed. While a non-pourable gel is formed by this procedure within about 15 seconds, the gel is entirely destroyed when immersed in 5 N NaOH for about one hour.

EXAMPLE 2

An aqueous solution containing ~20 percent of a homopolymer of acrylamide is prepared and found to have a pH of 4.9 and a viscosity of 388 centipoises at ~25° C. as determined with a Brookfield LVT viscometer using a #2 spindle at 60 rpm. To a 40 g-portion of this solution is added with stirring an amount of a 40% solution of glyoxal in water as specified in Table I. To the resulting stirred solution is added with mixing a 40-g portion of a second solution containing 0.4 g of $Na_3PO_4$, an amount of 5.25% active sodium hypochlorite aqueous solution as specified in Table I and a remaining amount of water. The resulting mixture has an initial pH

EXAMPLE 3

A packing device is positioned in a sewer wherein a large eroded crack has developed where the seal between two sections of pipe has failed. The device has inflatable collars at either end of a rigid cylinder having a diameter sufficiently smaller than the sewer pipe to enable the device to be maneuvered into the desired position by cables. The rigid cylinder carries dual piping which connects to nozzles positioned in the annular space between the cylinder and the sewer pipe and directed so that streams of fluid issuing from the nozzles will impinge on each other and mix together. The piping is connected to pressure hoses which are carried back through a manhole and connected to the outputs of positive displacement metering pumps. At least one of said outputs is fitted with a pressure gauge. The input end of one pump is connected to a first tank containing a known weight of an aqueous solution containing 20 percent of a polyacrylamide similar to that of Example 1 above. The pH of this solution is adjusted to 5 by addition of concentrated $H_2SO_4$. This solution is characterized by a viscosity of 450 cps (Brookfield LVT, #2 spindle, 30 rpm, 27° C.) and has been treated with a small amount of sodium sulfite to react out most of the residual acrylamide monomer and with an antimicrobial amount of sodium pentachlorophenate to protect against mold growth. To said solution there is admixed about 0.8 part of an aqueous solution containing 40 percent glyoxal for each 100 parts of the polyacrylamide solution. No gelation occurs at the predetermined pH of about 5 for the mixture when it is maintained at room temperature for relatively short periods, e.g., one to two weeks.

The input end of the second pump is connected to a second tank containing an aqueous solution of 1.5 percent of trisodium phosphate and 1.7 percent of NaOCl such that the pH of this solution is 12.3. The amount of solution in the second tank is approximately equal in volume to the aqueous solution in the first tank. The pumps are calibrated so that they deliver equal volumes in equal times. When a test sample of solution from the first tank is mixed with an equal volume of the solution from the second tank it is found that the resulting mixture forms a non-pourable gel in less than about 40 seconds.

The packing device is positioned so that one of the collars is on either side of the crack in the sewer and the collars are inflated to form a positive pressure seal against the interior of the sewer pipe. The pumps are started so that the polymer-dialdehyde solution and the trisodium phosphate-sodium hypochlorite solution are mixed in the annular space of the packing device and the resulting mixture forced into and through the cracks into the surrounding medium. When the pressure gauge shows a sharp rise in pressure the pumps are disconnected and the packing device deflated and removed from the sewer. On subsequent inspection it is found that the cracked area is filled and covered with a firm adherent aqueous polymer gel.

In cases where a highly porous formation or void exists outside a cracked or perforated sewer pipe or well casing it is generally desirable to first introduce a more dilute solution containing from 2 to 10 percent of amide polymer together with a correspondingly decreased proportion of polyaldehyde, hypohalite salt and relatively strong base so that the gelable composition may be pumped into the porosities or voids more readily. In such cases it is usually desirable to increase the concentration of amide polymer and proportion of polyaldehyde and hypohalite salt toward the end of the treatment in order to assure the desired structural integrity in the final seal.

In instances wherein it is desirable to have a noticeable delay between the time when the amide polymer, the dialdehyde, hypohalite salt and the alkaline agent are contacted and the time in which the gel reaction occurs, it is desirable to reduce the alkalinity of the mixed solutions such that the pH of such solution is at a value between about 8 to about 11, preferably from about 9 to about 10. At the lower values of pH in the aforementioned ranges, the time between initial contacting of the reactants and gelation (while it depends significantly on the concentration of the reactants) will generally vary from minutes to about 48 hours. In contrast, at the higher levels of pH, gelation occurs at times from about 5 to about 30 seconds.

What is claimed is:

1. A method for rendering a porous structure impermeable which comprises treating the porous structure with a gelable aqueous reaction mixture comprising an aqueous medium having dispersed therein a water-soluble polymer derived from an ethylenically unsaturated amide, an aliphatic polyaldehyde and a metal salt of a hypohalite in proportions such that, at an effective reaction temperature and an alkaline pH from about 8 to about 13.5, the reaction mixture upon being forced into and over the porosities of the structure reacts to form a gel capable of rendering said structure impermeable to the passage of aqueous liquids.

2. The method of claim 1 wherein the gelable reaction mixture is prepared by mixing in an aqueous medium the polyaldehyde with amide polymer, an alkali metal hypohalite at a pH from about 8 to 13.5 in or immediately adjacent to said porosities.

3. The method of claim 2 wherein the reaction mixture has an initial pH from about 10 to about 13.

4. The method of claim 1 wherein the amide polymer is a homopolymer or copolymer of acrylamide.

5. The method according to claim 1 wherein the polyaldehyde is a dialdehyde.

6. The method of claim 5 wherein the dialdehyde is glyoxal.

7. The method of claim 2 wherein the alkali metal hypohalite is sodium hypochlorite.

8. A gelable aqueous reaction mixture comprising an aqueous medium having dispersed therein a water-soluble polymer derived from an ethylenically unsaturated amide, an aliphatic polyaldehyde and a metal salt of a hypohalite in proportions such that, at an effective reaction temperature and an alkaline pH from about 8 to about 13.5, the reaction mixture reacts to form a water-insoluble gel.

9. The mixture of claim 8 wherein the amide polymer is a homopolymer or copolymer of acrylamide, the polyaldehyde is glyoxal and the hypohalite salt is sodium hypochlorite.

10. The gel of claim 8.

11. The method of claim 4 wherein the polymer has a molecular weight such that an aqueous solution containing 40 weight percent of the polymer has a viscosity in the range from about 50 to about 15,000 centipoises as determined by a Brookfield LVT viscometer (#2 spindle, 15 rpm and 25° C.).

12. The method of claim 1 wherein the polymer has a molecular weight such that an aqueous solution containing 20 weight percent of the polymer has a viscosity in the range from about 100 to about 15,000 centipoises as determined by a Brookfield LVT viscometer (#2 spindle, 15 rpm and 25° C.).

13. The reaction mixture of claim 9 wherein the polymer has a molecular weight such that an aqueous solution containing 40 weight percent of the polymer has a viscosity in the range from about 50 to about 15,000 centipoises as determined by a Brookfield LVT viscometer (#2 spindle, 15 rpm and 25° C.).

14. The reaction mixture of claim 8 wherein the polymer has a molecular weight such that an aqueous solution containing 20 weight percent of the polymer has a viscosity in the range from about 100 to about 15,000 centipoises as determined by a Brookfield LVT viscometer (#2 spindle, 15 rpm and 25° C.).

15. The method of claim 1 wherein the polymer contains from about 50 to 100 mole percent of one or more ethylenically unsaturated carboxamide monomers.

16. The method of claim 1 wherein the polymer contains from about 90 to 100 mole percent of acrylamide, the polyaldehyde is glyoxal and the hypohalite salt is sodium hypohalite.

17. The method of claim 1 wherein a solution of polymer and polyaldehyde and an alkaline hypohalite solution are introduced into the porous structures via separate streams.

* * * * *